United States Patent
Takamizawa

(10) Patent No.: US 7,007,057 B2
(45) Date of Patent: Feb. 28, 2006

(54) 0.75-POWER COMPUTING APPARATUS AND METHOD AND PROGRAM FOR USE THEREWITH

(75) Inventor: Yuichiro Takamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 10/029,945

(22) Filed: Dec. 31, 2001

(65) Prior Publication Data
US 2002/0099750 A1  Jul. 25, 2002

(30) Foreign Application Priority Data
Jan. 24, 2001  (JP) ............... 2001-015171

(51) Int. Cl.
*G06F 7/52*  (2006.01)

(52) U.S. Cl. .................... 708/606
(58) Field of Classification Search ........ 708/605–606, 708/500
See application file for complete search history.

(56) References Cited

U.S. PATENT DOCUMENTS

| | | | |
|---|---|---|---|
| 5,841,377 A | | 11/1998 | Takamizawa et al. |
| 6,128,638 A | * | 10/2000 | Thomas ............. 708/606 |
| 6,480,873 B1 | * | 11/2002 | Inoue et al. ......... 708/606 |
| RE38,593 E | | 9/2004 | Takamizawa et al. |
| 2002/0147753 A1 | * | 10/2002 | Rao et al. .......... 708/606 |

FOREIGN PATENT DOCUMENTS

JP  10-20897  1/1998

OTHER PUBLICATIONS

"Information Technology—Generic coding of moving pictures and associated audio, Part 7: Advanced Audio Coding, AAC," ISO/IEC 13818-7, PPS. ii-v (introduction) and 1-88, © ISO/IEC, (1997).

\* cited by examiner

*Primary Examiner*—Tan V. Mai
(74) *Attorney, Agent, or Firm*—Foley & Lardner LLP

(57) ABSTRACT

To provide an audio signal quantization device in which an amount of arithmetical operation can be reduced. A 0.75-power computing apparatus includes: an inverse number computing unit; a first −0.5-power computing unit; a multiplication unit; a second −0.5-power computing unit; and a program storage medium that is connected to an outside, whereby a program stored in the program storage medium is executed to compute the 0.75-power in a quantization computing expression. The inverse number computing unit, the first −0.5-power computing unit, the multiplication unit, and the second −0.5-power computing unit operate in such a manner that a multiplication between an infinity and zero which leads its operation result to an indefinite value is inhibited.

9 Claims, 7 Drawing Sheets

0.75-POWER COMPUTING APPARATUS AND METHOD AND PROGRAM FOR USE THEREWITH

BACKGROUND OF THE INVENTION

1. Field of the Invention

The present invention relates to a 0.75-power computing apparatus and method and a program for use therewith, and more particularly to a 0.75-power computing method for use in the quantization of an audio signal.

2. Description of the Related Art

Conventionally, as an audio coding method, the details of the MPEG (Moving Picture Experts Group)-2 AAC (Advanced Audio Coding) standardization that is an international standard method were described in "Information Technology—Generic coding of moving pictures and associated audio, Part 7: Advanced Audio Coding, AAC" (1997).

A configuration of an MPEG-2 AAC coding device is shown in FIG. 3. As shown in FIG. 3, the conventional audio coding device represented by this MPEG-2 AAC is typically constituted of a transform section 11 for transforming an input audio signal to generate a transformed signal, a psychoacoustic analysis section 12 for making the analysis simulating the auditory characteristic for the input audio signal to compute a quantization precision, a quantization section 13 for quantizing the transformed signal at the quantization precision, and a bit stream generating section 14 for generating a bit stream by multiplexing the transformed signal quantized at the quantization precision and the like.

The transform section 11 transforms the input audio signal to generate the transformed signal, and output it to the quantization section 13. The MPEG-2 AAC employs the MDCT (Modified Discrete Cosine Transform) as the transform. The psychoacoustic analysis section 12 makes the analysis simulating the auditory characteristic for the input audio signal to compute the quantization precision and output it to the quantization section 13.

The quantization section 13 quantizes the map signal in accordance with the quantization precision obtained by the psychoacoustic analysis section 12 to output a quantized value to the bit stream generating section 14. The bit stream generating section 14 makes the Huffman coding of the quantized value, and multiplexes it with auxiliary information required in decoding the quantization precision and the like to form the bit stream and output it.

Herein, the details of the blocks other than the quantization section 13 are described in the MPEG-2 AAC specification and so on and widely well known, and therefore the description of their blocks will be omitted.

The quantization section 13 quantizes the transformed signal M output from the transform section 11, using the quantization precision ($2^N$) obtained by the psychoacoustic analysis section 12, in accordance with a computation expression as follows:

$$L = \text{INT}((\text{ABS}(M) \cdot 2^N)^{0.75} + 0.4054) \qquad (1)$$

so that the quantized value L is obtained. Where ABS(Z) is a function that returns the absolute value of Z, and INT(Z) is a function that returns an integral part of Z by truncating the decimal fraction.

In the expression (1), the absolute value ABS(M) is firstly obtained for the transformed signal M output from the transform section 11. Then, the absolute value ABS(M) is multiplied by ($2^N$) that is the quantization precision obtained by the psychoacoustic analysis section 12, the multiplied result is raised to the 0.75-power, and 0.4054 is added. Further, the integral part of the computed result is taken to acquire the quantized value L.

This expression (1) is executed many times in coding the audio signal, thereby requiring a large amount of arithmetical operation. Particularly, since the computation of the 0.75-power takes most part of the arithmetical operation, the efficient computation of the 0.75-power is indispensable for decreasing the amount of arithmetical operation and reducing the size of apparatus.

Conventionally, the efficient computation method of computing the 0.75-power is well known in the following two ways. A first method is shown in FIGS. 4 and 5. FIG. 4 is a block diagram showing the configuration of the conventional efficient 0.75-power computing apparatus, and FIG. 5 is a flowchart showing its computation procedure.

The conventional efficient 0.75-power computing apparatus as shown in FIG. 4 comprises first 0.5-power computing means 21, multiplication means 22, and second 0.5-power computing means 23. The first 0.5-power computing means 21 computes the 0.5-power of an input value A (step S11 in FIG. 5) and outputs its operation result B (=$A^{0.5}$) to the multiplication means 22.

The multiplication means 22 calculates the product between the operation result B output from the first 0.5-power computing means 21 and the input value A (step S12 in FIG. 5), and outputs the operation result C (=A×B) to the second 0.5-power computing means 23.

The second 0.5-power computing means 23 calculates the 0.5-power of the operation result C output from the multiplication means 22 (step S13 in FIG. 5), and outputs its operation result D (=$C^{0.5}$). The value of the operation result D obtained in the above manner is the 0.75-power of the input value A.

Consider the clock number (operation amount) that is required when the above method is implemented on a microprocessor element widely employed at present as a CPU (Central Processing Unit) of a personal computer. Assuming that this microprocessor element requires 29 clocks at minimum for computing the 0.5-power (SQRT instruction), and 5 clocks for the multiplication (MUL instruction), the computing procedure as shown in FIG. 5 takes (29+5+29)=63 clocks in total.

A second method with a smaller number of clocks is shown in FIGS. 6 and 7. FIG. 6 is a block diagram showing the configuration of the conventional efficient 0.75-power computing apparatus, and FIG. 7 is a flowchart showing its computing procedure.

The conventional efficient 0.75-power computing apparatus comprises first −0.5-power computing means 31, first multiplication means 32, second −0.5-power computing means 33, second multiplication means 34, and indefinite value replacing means 35, as shown in FIG. 6.

The first −0.5-power computing means 31 computes the −0.5-power of an input value A (step S21 in FIG. 7) and outputs its operation result B (=$A^{-0.5}$) to the first multiplication means 32 and the second −0.5-power computing means 33. The first multiplication means 32 calculates the product between the operation result B output from the first −0.5-power computing means 31 and the input value A (step S22 in FIG. 7), and outputs the operation result C (=A×B) to the second multiplication means 34.

The second −0.5-power computing means 33 calculates the −0.5-power of the operation result B output from the first −0.5 computing means 31 (step S23 in FIG. 7), and outputs its operation result D (=$B^{-0.5}$). The second multiplication means 34 calculates the product between the operation result C output from the first multiplication means 32 and the operation result D output from the second −0.5-power computing means 33 (step S24 in FIG. 7), and outputs the operation result E (=C×D). The value E obtained in the above manner is the 0.75-power of the input value A.

When the second method is implemented on the microprocessor element, assuming that this microprocessor element requires 2 clocks for computing the −0.5-power (RSQRT instruction), and 5 clocks for the multiplication (MUL instruction), the computing procedure as shown in FIG. 7 takes (2+5+2+5)=14 clocks in total. If steps S22 and S23 having no mutual dependency on the arithmetical operation can be performed in parallel at the same time, the computing procedure requires (2+5+5)=12 clocks in total.

By employing this second method, the required number of clocks (arithmetical operation amount) can be reduced from 64 clocks required in employing the first method to 12 clocks. However, the second method gives rise to the problem when the input value A is equal to zero.

In the case where the second method is implemented on the microprocessor element, because the RSQRT instruction for computing the −0.5-power makes an approximate computation, the operation result of the −0.5-power of zero (0) is a particular value indicating the infinity. Hence, the value of the operation result B at step S21 is the particular value indicating the infinity.

Moreover, because the result of multiplication between the infinity and zero (0) is an indefinite value, the value of the operation result C at step S22 is a particular value indicating an indefinite value. At step S24, since the operation result C of one multiplication is the indefinite value, the multiplication result E is also the particular value indicating the indefinite value.

Accordingly, it is necessary to perform an operation of replacing the operation result of the 0.75-power computing with zero only if the input value A is equal to zero, or an operation of replacing the operation result with zero only if the operation result is the indefinite value (indefinite value replacing means 35 in FIG. 6, steps S25 and S26 in FIG. 7). This processing needs a conditional judgement instruction, and typically takes a great number of clocks.

The conventional 0.75-power computing apparatus as shown in FIG. 6 requires the conditional judgement processing when the input value is equal to zero, and thus has a problem that the amount of arithmetical operation is increased.

SUMMARY OF THE INVENTION

Thus, it is an object of the present invention to solve the above-mentioned problem, and to provide a 0.75-power computing apparatus and method that can reduce the amount of arithmetical operation, and a program for use therewith.

A 0.75-power computing apparatus according to the present invention inhibits a multiplication between an infinity and zero which leads its operation result to an indefinite value.

Another 0.75-power computing apparatus according to the present invention comprises inverse number computing means for computing an inverse number of an input value, first −0.5-power computing means for computing the −0.5-power of the input value, multiplication means for computing a product between a computed result of the inverse number computing means and a computed result of the −0.5-power computing means, and second −0.5-power computing means for computing the −0.5-power of a computed result of the multiplication means.

A 0.75-power computing method according to the present invention inhibits a multiplication between an infinity and zero which leads its operation result to an indefinite value.

Another 0.75-power computing method according to the present invention comprises a first step for computing an inverse number of an input value, a second step for computing the −0.5-power of the input value, a third step for computing a product between a computed result at the first step and a computed result at the second step, and a fourth step for computing the −0.5-power of a computed result at the third step.

According to the present invention, there is provided a program that is executed on a computer wherein a multiplication between an infinity and zero which leads its operation result to an indefinite value is inhibited.

Also, according to the present invention, there is provided another program that is executed on a computer, comprising a first step for computing an inverse number of an input value, a second step for computing the −0.5-power of the input value, a third step for computing a product between a computed result at the first step and a computed result at the second step, and a fourth step for computing the −0.5-power of a computed result at the third step.

That is, an audio signal quantization device of the present invention comprises inverse number computing means, first −0.5-power computing means, multiplication means, and second −0.5-power computing means in which the multiplication between the infinity and zero which leads the operation result to the indefinite value is inhibited. Thereby, even in the case where the input value is zero, no particular processing is needed, resulting in the reduced amount of arithmetical operation in quantizing the signal.

DESCRIPTION OF THE PREFERRED EMBODIMENTS

Figure 1:
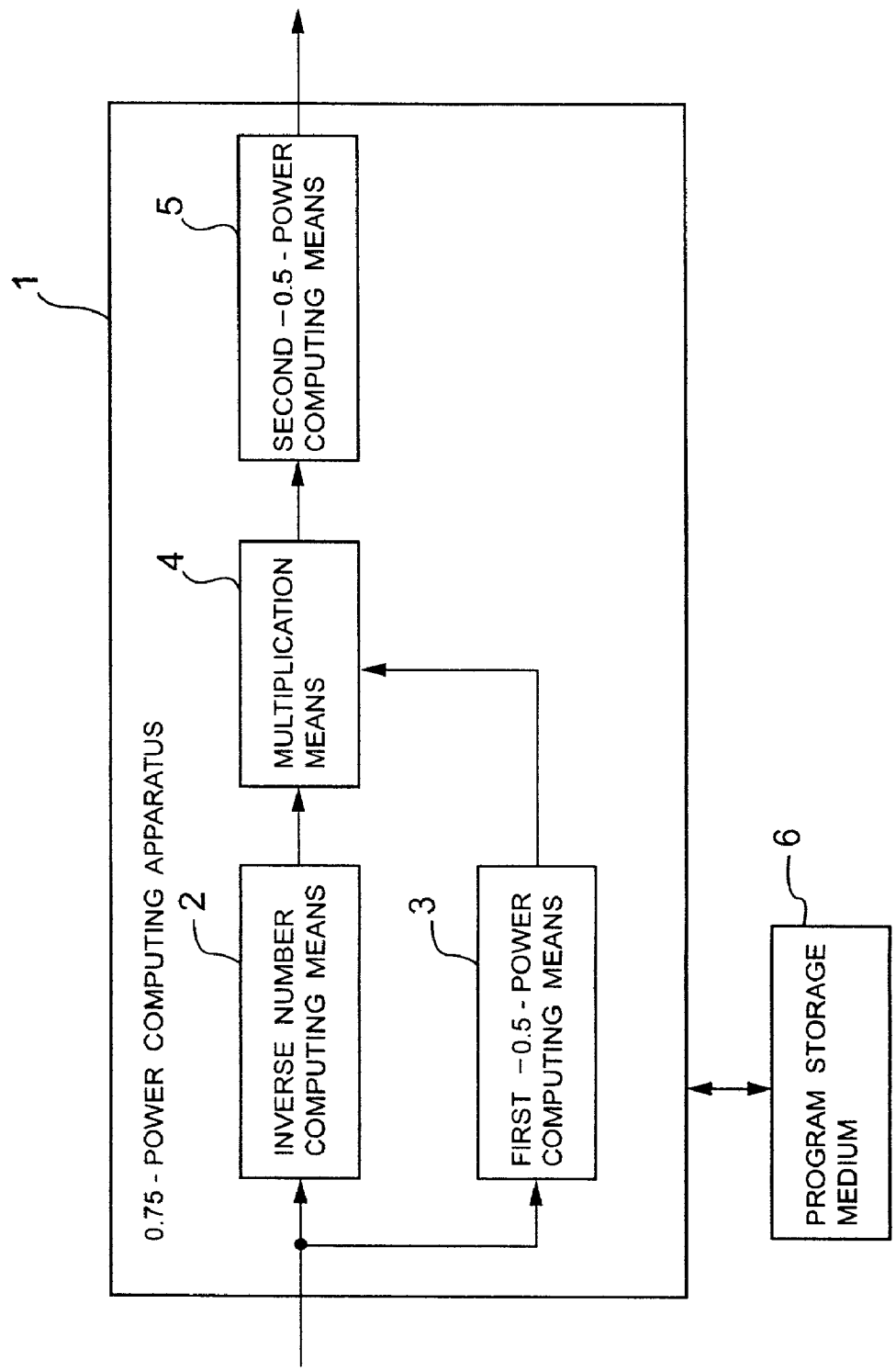
FIG. 1 is a block diagram showing a configuration of a 0.75-power computing apparatus according to one embodiment of the present invention.

One embodiment of the present invention will be described below by reference to the accompanying drawings. FIG. 1 is a block diagram showing a configuration of a 0.75-power computing apparatus according to one embodiment of the present invention. In FIG. 1, the 0.75-power computing apparatus 1 comprises inverse number computing means 2, first −0.5-power computing means 3, multiplication means 4, second −0.5-power computing means 5, and a program storage medium 6 that is connected to the outside, whereby the program stored in the program storage medium 6 is executed to compute the 0.75-power in the quantization computing expression (1) as described above.

Figure 2:
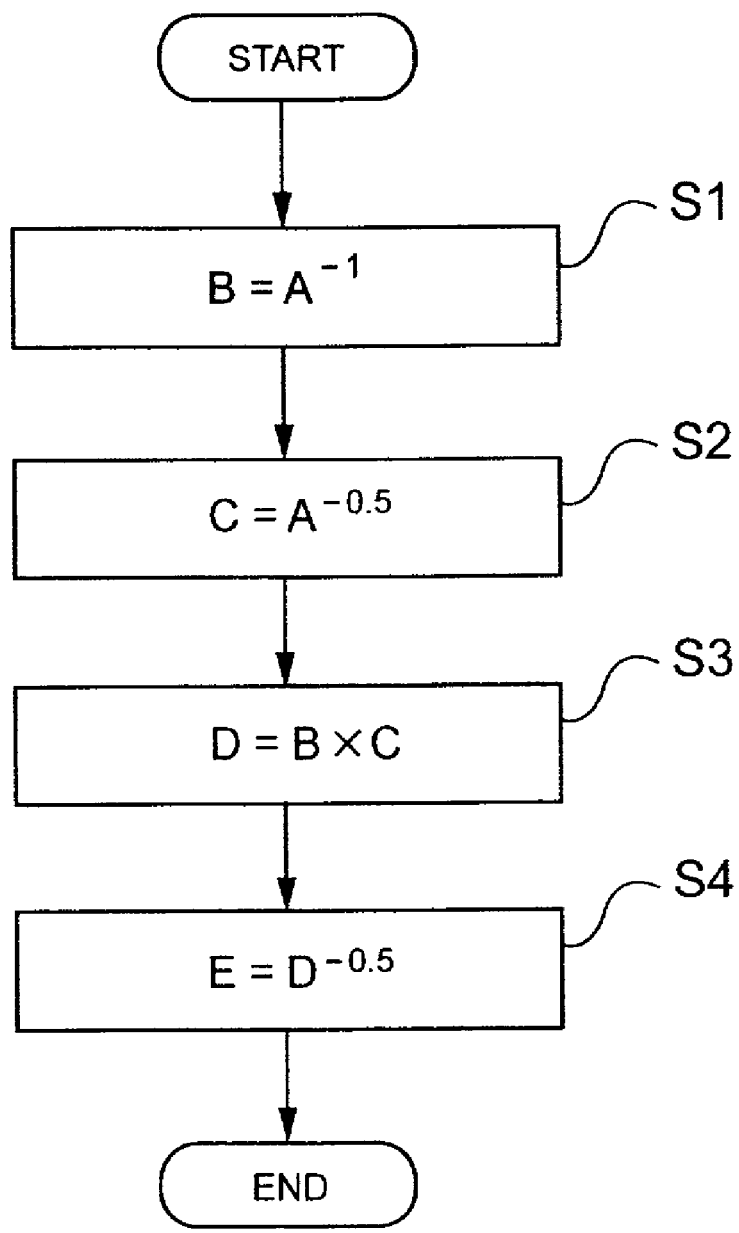
FIG. 2 is a flowchart showing a computing procedure of the 0.75-power computing apparatus as shown in FIG. 1.
Figure 3:
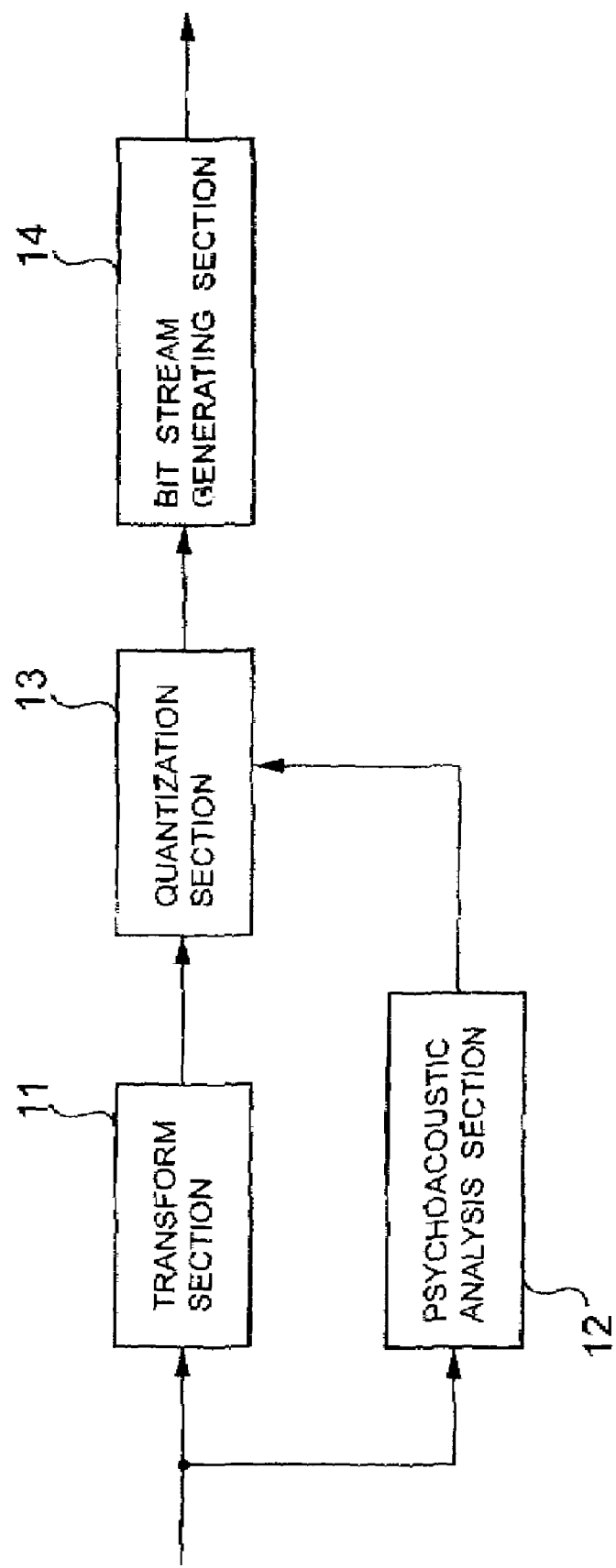
FIG. 3 is a block diagram showing a configuration of a conventional audio coding device.
Figure 4:
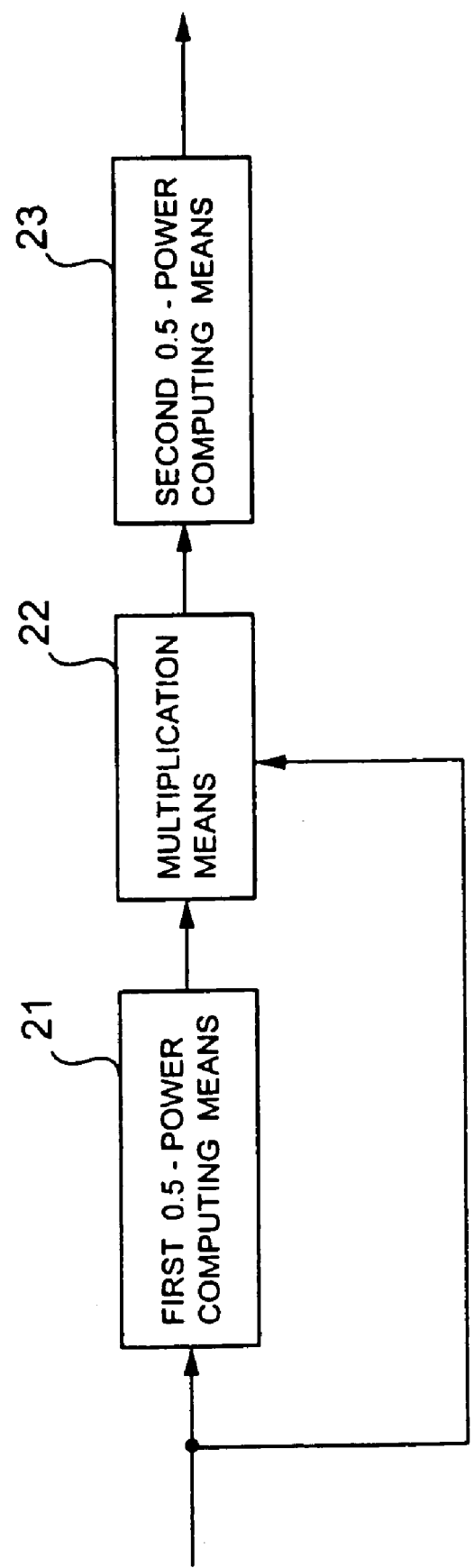
FIG. 4 is a block diagram showing an example of a configuration of a conventional 0.75-power computing apparatus.
Figure 5:
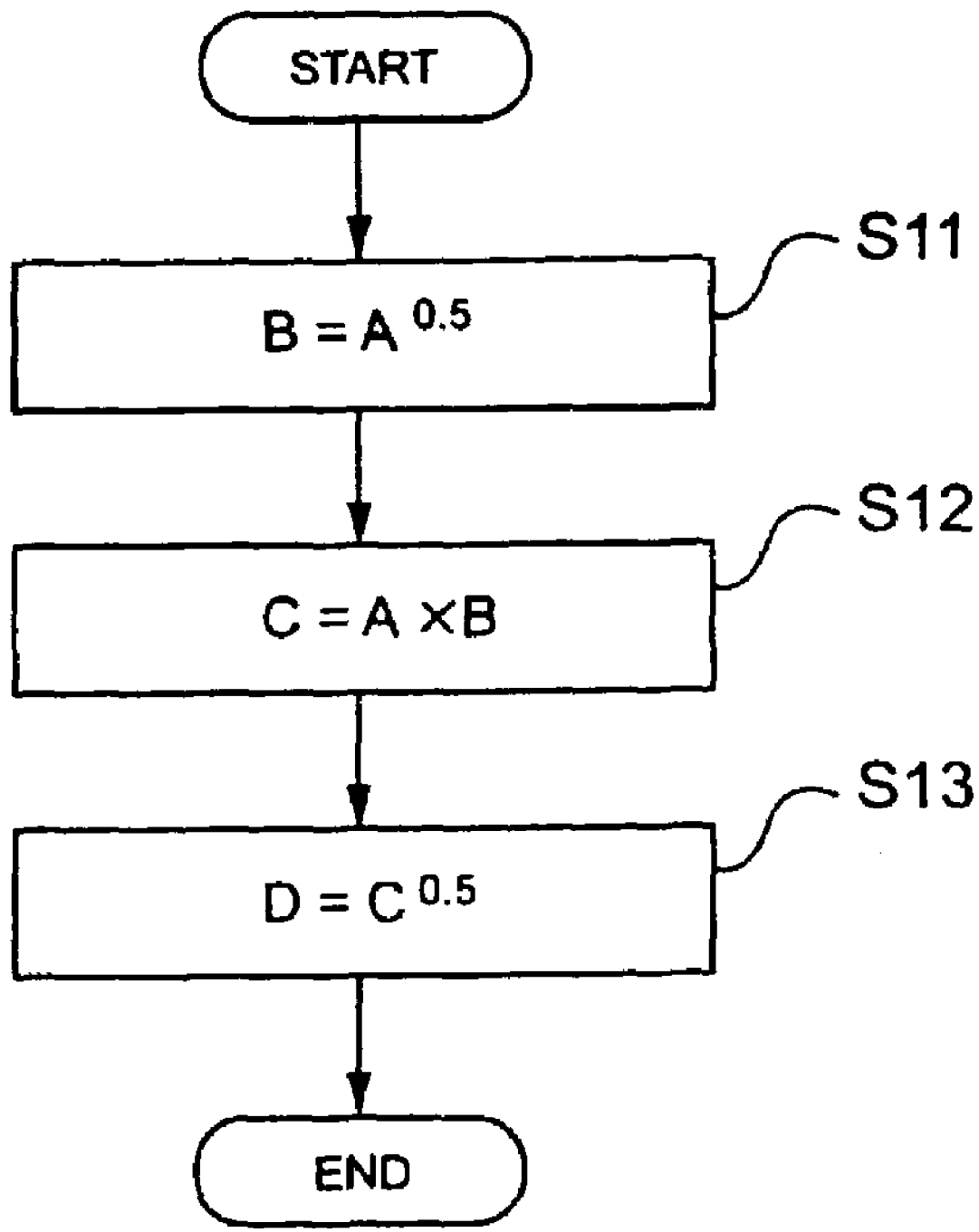
FIG. 5 is a flowchart showing a computing procedure of the 0.75-power computing apparatus as shown in FIG. 4.
Figure 6:
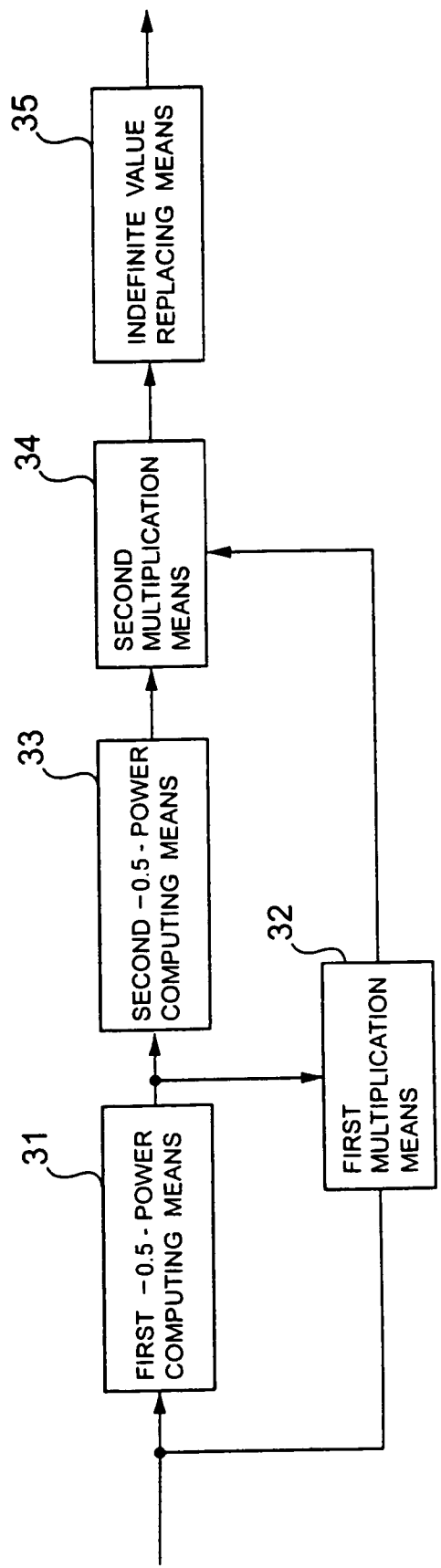
FIG. 6 is a block diagram showing another example of the configuration of the conventional 0.75-power computing apparatus.
Figure 7:
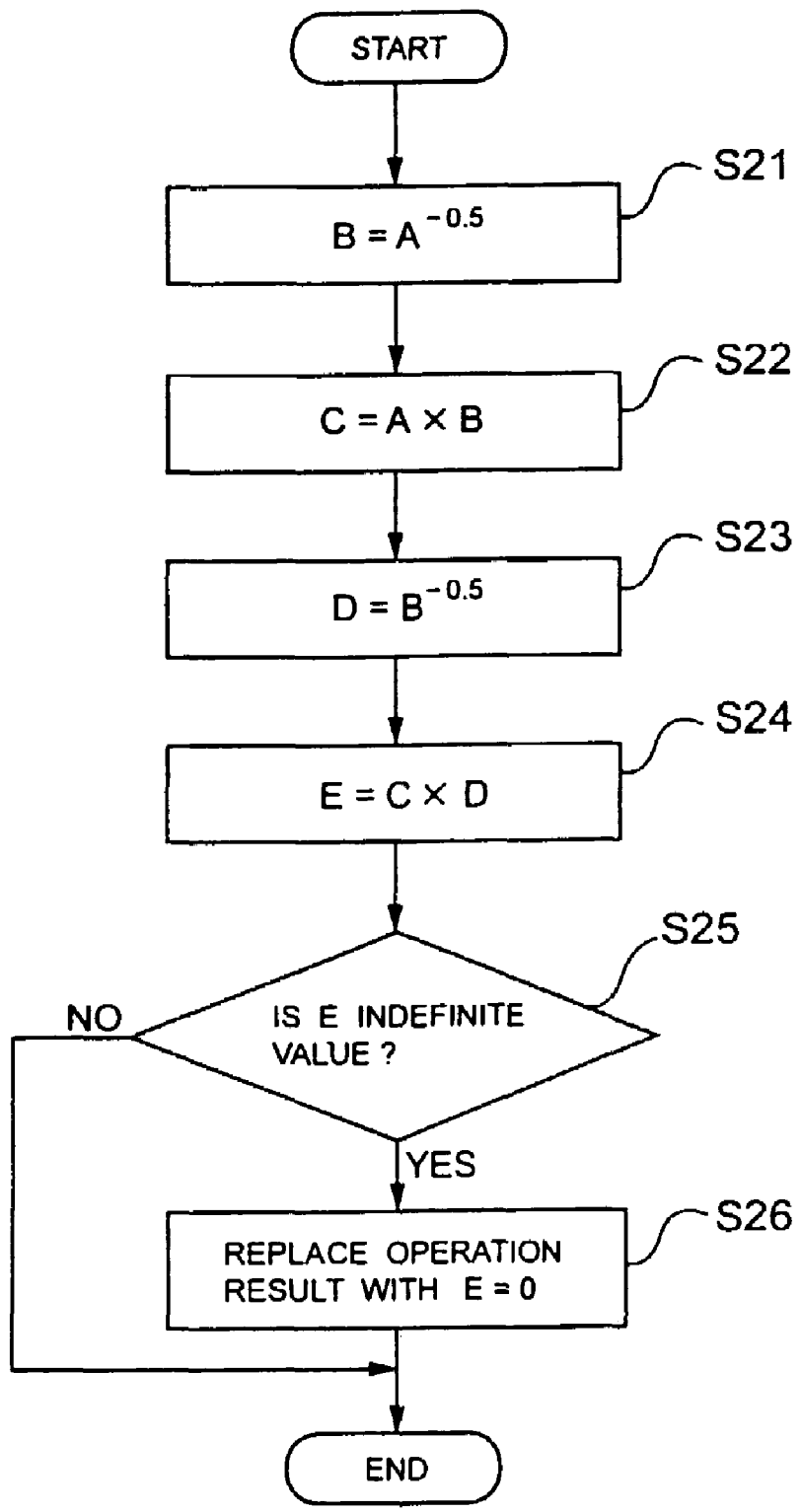
FIG. 7 is a flowchart showing a computing procedure of the 0.75-power computing apparatus as shown in FIG. 6.

FIG. 2 is a flowchart showing a computing procedure of the 0.75-power computing apparatus 1 according to the embodiment of the present invention. Referring now to FIGS. 1 and 2, the computing procedure of the 0.75-power computing apparatus 1 according to the embodiment of the present invention will be set forth. The computing procedure of this 0.75-power computing apparatus 1 is realized by executing the program stored in the program storage medium 6.

The inverse number computing means 2 computes an inverse number of an input value A (step S1 in FIG. 2), and outputs its operation result B ($=A^{-1}$) to the multiplication means 4. The first −0.5-power computing means 3 computes the −0.5-power of the input value A (step S2 in FIG. 2) and outputs its operation result C ($=A^{-0.5}$) to the multiplication means 4.

The multiplication means 4 calculates the product between the operation result B output from the inverse number computing means 2 and the operation result C output from the first −0.5-power computing means 3 (step S3 in FIG. 2), and outputs its operation result D ($=B \times C$) to the second −0.5-power computing means 5.

The second −0.5-power computing means 5 calculates the −0.5-power of the operation result D output from the multiplication means 4 (step S4 in FIG. 2), and outputs its operation result E ($=D^{-0.5}$). The value of the operation result E obtained in the above manner by the second −0.5-power computing means 5 is the 0.75-power of the input value A.

In this way, by inhibiting the multiplication between the infinity and zero which leads the operation result to the indefinite value, no special processing is required when the input value A is equal to zero, whereby the computation of the 0.75-power that is a bottle neck in respect of the operation amount in the quantization processing can be realized with a low amount of arithmetical operation.

The above method in this embodiment is implemented on a microprocessor element widely used as a CPU (Central Processing Unit) for a personal computer. In the case where the input value A is equal to zero, the value of the operation result B at step S1 is a particular value indicating the infinity.

Also, at step S2, the value of the operation result C is the particular value indicating the infinity, and at step S3, the multiplication between the infinity and the infinity is made, so that the value of the operation result D becomes infinite. And at step S4, the −0.5-power of the infinity is equal to zero, and finally the operation result becomes zero. Accordingly, there is no need for performing the special processing when the input value is zero, although conventionally required. Consequently, the amount of arithmetical operation can be reduced.

In the case where this method is implemented on the microprocessor element, assuming that the computation of inverse number (RCP instruction) takes 2 clocks, the computation of the −0.5-power (RSQRT instruction) takes 2 clocks, and the multiplication (MUL instruction) takes 5 clocks, the computation of the 0.75-power can be realized with a total of (2+2+5+2)=11 clocks in accordance with the computing procedure as shown in FIG. 2.

If steps S1 and S2 having no mutual dependency on the arithmetical operation can be performed in parallel at the same time, the computation of the 0.75-power can be realized with a total of (2+5+2)=9 clocks. In this manner, the amount of arithmetical operation for the quantization computation having a large amount of operation can be reduced.

In this embodiment, the method of reducing the amount of arithmetical operation in computing the 0.75-power in the quantization computation has been described above, adopting the MPEG-2 AAC that employs the expression (1) for the quantization process as an example, but the method can be also applied to other processes and coding methods employing the computation of the 0.75-power. A typical example may be the quantization process in the MP3 (MPEG-1 Audio Layer 3) that is the international standard audio coding method.

As described above, according to the present invention, there is the effect that the amount of arithmetical operation can be reduced by inhibiting the multiplication between the infinity and zero which leads the operation result to the indefinite value.

What is claimed is:

1. A 0.75-power computing apparatus, comprising: inverse number computing means for computing an inverse number of an input value; first −0.5-power computing means for computing the −0.5-power of said input value; multiplication means for computing a product between a computed result of said inverse number computing means and a computed result of said −0.5-power computing means; and second −0.5-power computing means for computing the −0.5-power of a computed result of said multiplication means.

2. The 0.75-power computing apparatus according to claim 2, being used for a coding method employing the computation of the 0.75-power.

3. The 0.75-power computing apparatus according to claim 3, being used for an audio signal quantization device quantizing a transformed audio signal by using the computation of the 0.75-power.

4. A 0.75-power computing method, comprising:
   a first step for computing, on a computer, an inverse number of an input value;
   a second step for computing, on the computer, the −0.5-power of said input value;
   a third step for computing, on the computer, a product between a computed result at said first step and a computed result at said second step; and
   a fourth step for computing, on the computer, the −0.5-power of a computed result at said third step.

5. The 0.75-power computing method according to claim 4, being used for a coding method employing the computation of the 0.75-power for coding data to be output external to the computer.

6. The 0.75-power computing method according to claim 5, being used for an audio signal quantization device quantizing a transformed audio signal to be output external to the computer by using the computation of the 0.75-power.

7. A program product having machine readable program code for performing 0.75-power computing, the program code, when executed, causing a machine to perform the following steps:
   a first step for computing an inverse number of an input value;
   a second step for computing the −0.5-power of said input value;
   a third step for computing a product between a computed result at said first step and a computed result at said second step; and
   a fourth step for computing the −0.5-power of a computed result at said third step.

8. The program product according to claim 7, being used for a coding method employing the computation of the 0.75-power.

9. The program product according to claim 8, being used for an audio signal quantization device quantizing a transformed audio signal by using the computation of the 0.75-power.

* * * * *